United States Patent [19]
Dandl

[11] 3,893,283
[45] July 8, 1975

[54] VARIABLE WIDTH EARTH SURFACE TREATING APPARATUS

[76] Inventor: John E. Dandl, 279 Rio Linda Ave., Apt. No. 2, Chico, Calif. 95926

[22] Filed: June 20, 1974

[21] Appl. No.: 481,379

[52] U.S. Cl. .................. 56/6; 56/13.6; 56/228; 280/463
[51] Int. Cl. .............................. A01d 75/30
[58] Field of Search .......... 56/6, 7, 13.5, 13.6, 13.7, 56/13.8, 228, 377; 280/463

[56] References Cited
UNITED STATES PATENTS

| | | | |
|---|---|---|---|
| 2,525,047 | 10/1950 | Sawtelle et al. | 56/7 |
| 3,068,630 | 12/1962 | Caldwell | 56/6 |
| 3,717,981 | 8/1970 | van der Lely | 56/6 |

Primary Examiner—Robert Peshock
Assistant Examiner—J. N. Eskovitz
Attorney, Agent, or Firm—Robert Charles Hill

[57] ABSTRACT

Earth surface treating apparatus such as a mower or flail, composed of two units which are drawn over an earth surface. One of the units is drawn in trailing relation to the other by means of an elongate drawbar. Means for adjusting the angular position of the drawbar so that the rear unit can be drawn immediately behind the forward unit or along a laterally displaced path. Mechanism on the apparatus for positioning the rear unit above the earth surface for high speed over the road travel, such mechanism affording return of the apparatus to an earth treating position as desired.

7 Claims, 7 Drawing Figures

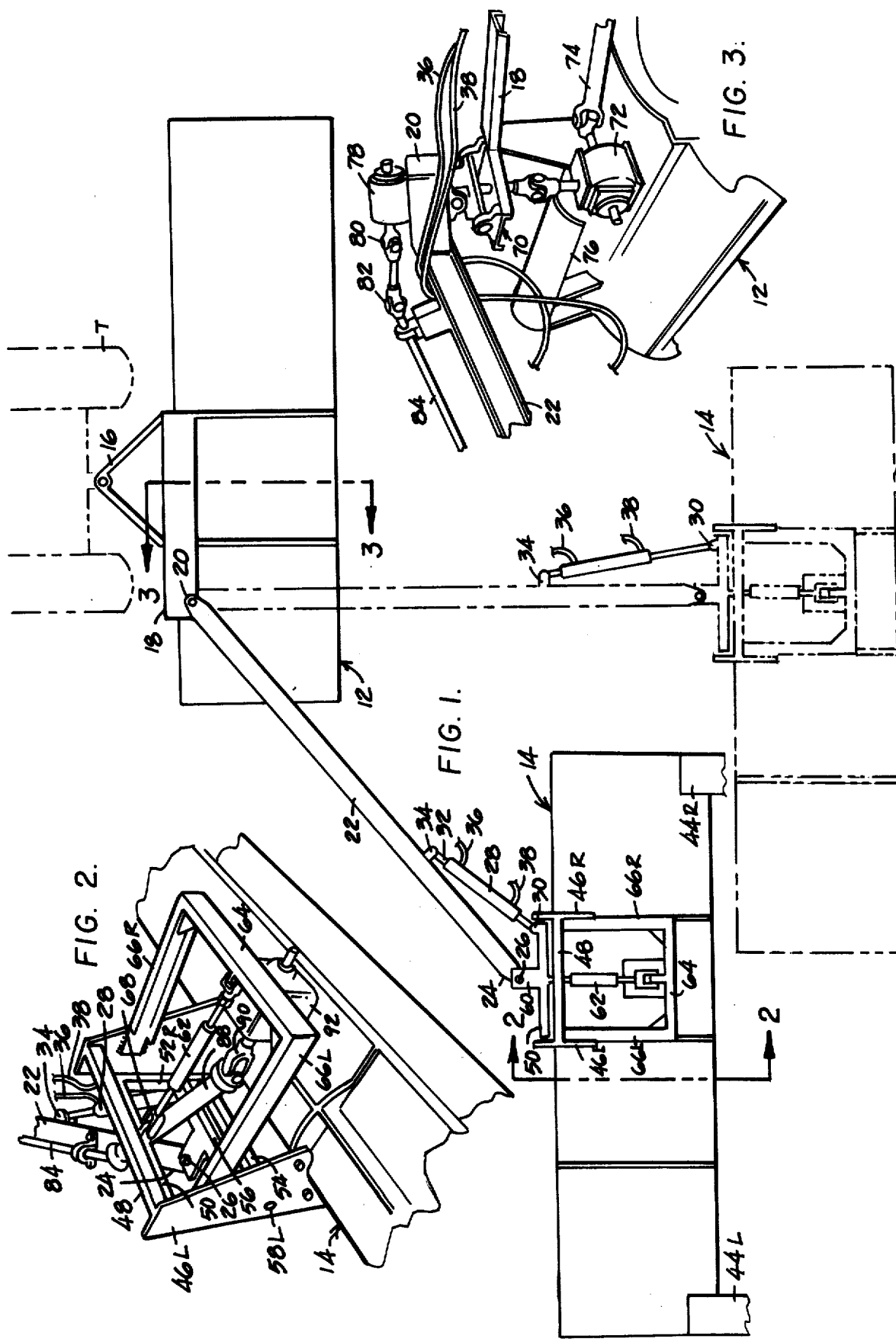

3,893,283

VARIABLE WIDTH EARTH SURFACE TREATING APPARATUS

FIELD OF THE INVENTION

This invention relates to earth surface treating apparatus such as mowers, flails and the like, and more particularly to earth surface treating apparatus where the width of the path or swath is adjustable.

DESCRIPTION OF THE PRIOR ART

The desirability for variable width earth surface treating apparatus has been noted in such U.S. Pat. as No. 3,699,752. The structure disclosed in that patent fulfilled a significant need but is not capable of instantaneous width variations since the addition or removal of one or more modules is necessary to effect width variations in the prior art device.

SUMMARY OF THE INVENTION

In the embodiment of the invention that is described in more detail hereinafter there are two earth surface treating units of substantially identical width. One unit is supported at the rear of a tractor or like vehicle. A rigid drawbar has one end pivotally supported on the first unit and the opposite end similarly secured to the second unit which trails the first unit. A hydraulic cylinder is provided between the second unit at a point on the drawbar space from the rear extremity thereof so that the angle between the second unit and the drawbar can be adjusted. If the angle is established at about 90° the rear unit trails directly behind the front unit and the width of earth surface treatment is at its minimum. When the cylinder is retracted however so as to establish an acute angle between the rear unit and the drawbar the rear unit moves laterally of the forward unit so as to achieve a wider path of earth surface treatment.

An object of the present invention is to provide earth treating apparatus wherein the width of the path of treatment is readily adjustable. This object is achieved in the present invention by supporting the rear unit on a drawbar and providing means for varying the angle between the drawbar of the second or rear unit.

Another object is to provide a device in which the width of the path of earth surface treatment can be continuously varied during use of the apparatus. This object is achieved according to the present invention because the mechanism for adjusting the angle between the drawbar and the rear unit is remotely controllable from the driver's station in the towing vehicle. For example, a double acting hydraulic cylinder can be employed and the hoses to such cylinder can be led along the drawbar to control valves accessible to the operator of the towing vehicle.

Another object of the present invention is to provide an earth surface treating apparatus of the type referred to above that can be quickly converted for high speed over the road travel. This object is achieved in accordance with the present invention by supporting the rear unit on wheels that are spaced rearward of the rear unit. The axles on which the wheels are supported serve as a fulcrum and the connection between the drawbar and the rear unit is a range for pivotal movement about a horizontal axis which causes upward movement of the earth treating unit around the fulcrum formed by the axles. When the earth surface treating unit is elevated above the surface its sole support is by the aforementioned wheels and rapid travel over highways and roads is possible.

A feature and advantage of the rearward extending wheels is that the same wheels can be used for over the road transport as are used during earth surface treatment.

The foregoing together with other objects, features and advantages will be more apparent after referring to the following specification and accompanying drawings.

BRIEF DESCRIPTION OF THE DRAWINGS

FIG. 1 is a partially schematic plan view of an earth surface treating apparatus according to the present invention.

FIG. 2 is a perspective view of a fragment of FIG. 1 taken generally along line 2—2 of FIG. 1.

FIG. 3 is a perspective view of another fragment of FIG. 1 taken generally along line 3—3 of FIG. 1.

DESCRIPTION OF THE PREFERRED EMBODIMENT

Figure 4:
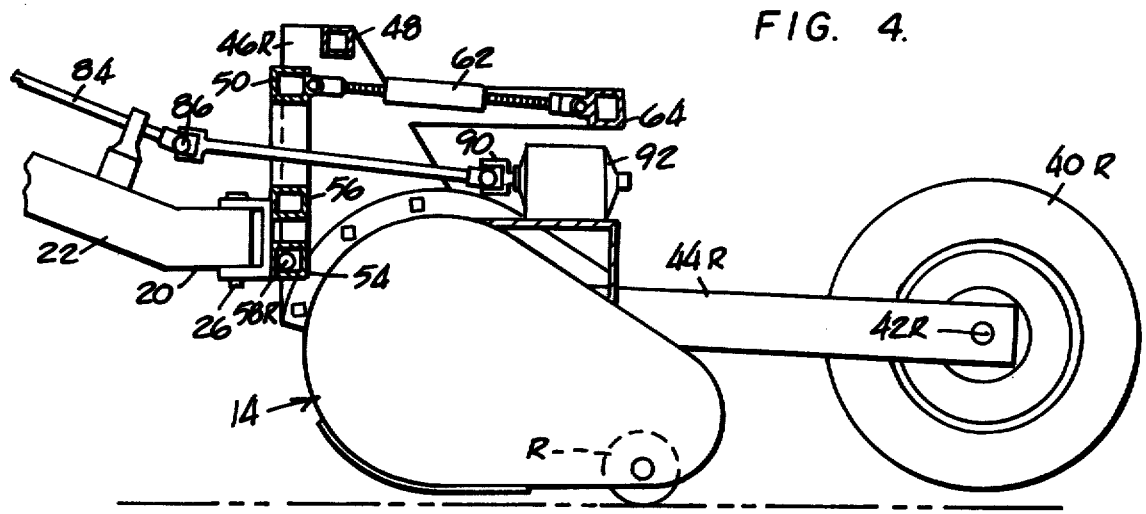
FIG. 4 is a side elevation of the rear unit of the present invention in a ground treating or lowered position.

Referring more particularly to the drawing reference numeral 12 indicates a forward earth surface treating unit and reference numeral 14 indicates a rearward earth surface treating unit. Because the specific details of the units do not per se form a part of the invention, such details will not be described in detail. It is sufficient to say for the purposes of the present description that the earth surface treating units can include mowers, flails, rakes, harrows, sweepers, or any other similar industrial or agricultural implement.

The apparatus is towed by a vehicle such as a tractor, a fragment of which is indicated at T. Forward unit 12 is attached to tractor T by any suitable arrangement such as a tongue hitch 16. Rigid with unit 12 and extending upward therefrom is a frame 18 to which is pivotally secured one extremity 20 of the drawbar 22. Drawbar 22 has an opposite or rear extremity 24 which is pivotally attached to earth surface treating unit 14, the axis of pivotal movement being vertically oriented, a pivot pin 26 is employed in the embodiment shown in the drawings. An actuator such as a double acting hydraulic cylinder 28 has one end secured at 30 to rear unit 14 at a point laterally spaced from pivot pin 26. The rod 32 of hydraulic cylinder 28 is secured to drawbar 22 at a point 34 spaced from rear extremity 24 of the drawbar. Hoses 36 and 38 communicate with opposite ends of cylinder 28 and are led along drawbar 22 to valves (not shown) that are accessible to the operator of Tractor T. Thus the operator of Tractor T can vary the amount that rod 32 extends from cylinder 28 and therefore can vary the angle between rear unit 14 and drawbar 22. As will be explained in more detail hereinafter such variation of the angle between the drawbar and the rear unit varies the lateral position of rear unit 14 and hence varies the width of the path that units 12 and 14, in combination, traverse.

Unit 14 is supported for movement over the earth surface by a pair of wheels 40R and 40L. The wheels are preferably identical and are preferably provided with rubber pneumatic tires of conventional form. The wheels are supported for rotation about a horizontal axis by axles 42R and 42L, respectively, which axles are mounted to the distal ends of respective arms 44R and 44L. Arms 44R and 44L are rigid with unit 14 and extend rearward therefrom. The forward portion of unit 14 is provided with vertical support according to the unique adjustable linkage provided by the present invention.

Figure 5:
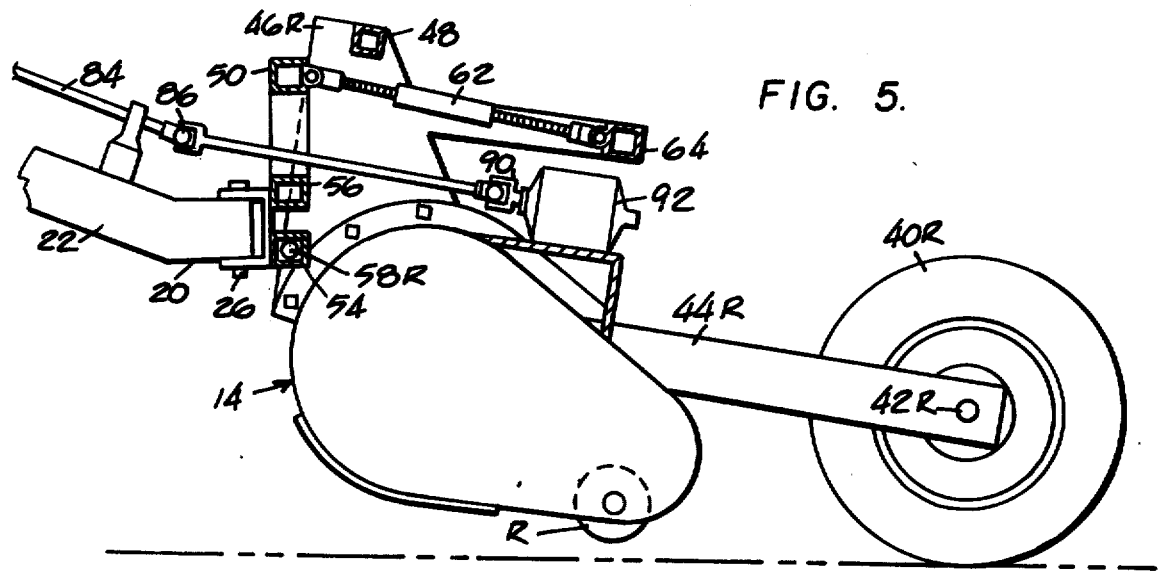
FIG. 5 is a side view similar to FIG. 4 but showing the unit raised for high speed over the road travel.

Rigid with unit 14 are right and left upstanding plates 46R and 46L, the upper or free ends of which are reinforced by a crossbar 48 in order to retain the plates in parallel spaced apart confronting relation. In the space between plates 46R and 46L is disposed a rectangular frame composed of an upper horizontally extending member 50, vertically extending side members 52R and 52L, a lower frame member 54 and an intermediate horizontally extending frame member 56. Pivot pins 58R and 58L join the rectangular frame at the lower region thereof for pivotal movement with respect to plates 46R and 46L. Extending forward from the medial region of horizontal members 54 and 56 are upper and lower trunnion plates 60 which are apertured to receive pivot pin 26. Thus it will be seen that the entire rear unit can pivot about the central axis of pins 58R and 58L between the lower position of FIG. 4 and the upper position of FIG. 5.

The pivotal position of the rectangular frame between plates 46R and 46L is determined by a longitudinally extensible member 62 which can be a turn buckle, a hydraulic cylinder, or the like. One end of longitudinally extensible member 62 is secured to a crossbar 64 which is supported rigid with plates 46R and 46L by rearward extending arms 66R and 66L. Thus the rear end of longitudinally extensible member 62 is rigid with unit 16. The forward end of the longitudinally extensible unit is secured to the medial region of crossbar 50 as at 68 so that as the longitudinally extensible member is lengthened or shortened pivotal movement about the axis of pins 58R and 58L occurs between the rectangular frame to which the rear extremity of drawbar 22 is attached and unit 14. When the longitudinally extensible member is moved to a relatively short or retracted position (see FIG. 4) unit 14 is lowered about a fulcrum coincident with axles 42R and 42L into an earth surface treating position with roller R in ground contact. When the longitudinally extensible member is lengthened or expanded (see FIG. 5) unit 14 is pivoted upward and out of contact with the earth surface. In the raised position the unit is ready for high speed over the road travel. During over the road travel it is preferred that cylinder 28 be positioned as shown in broken lines in FIG. 1 so that rear unit 14 tracks substantially directly behind forward unit 12.

In order to afford free vertical and horizontal movement of rear earth surface treating unit 14 it is desirable to mount forward extremity 20 of drawbar 22 to frame 18 via a universal joint, such universal joint being indicated at 70. The universal joint affords rocking movement about all horizontal axes as well as relative rotation between drawbar 22 and frame 18.

In cases where unit 14 is a powered unit, such as in a mower or flail, it is essential to transmit power thereto. For this purpose there is provided on front unit 12 a transmission or gear box 72 which is rotatively driven from a shaft 74 connected to the power take off (not shown) on tractor T. Transmission 72 has two outputs, one (not shown) extending under a guard 76 so as to power front unit 12 and the other a vertically extending shaft to a second transmission or gear box 78. The output shaft from transmission 78 is connected through two universal joints 80 and 82 to a drive shaft 84 which is journalled for rotation along drawbar 22. At the rear extremity shaft 84 is connected through a universal joint 86 to a sliding splined connector 88 and thence through a universal joint 92 a transmission or gear box 93. Transmission 92 has one or more output shafts (not shown) which conduct power to the active elements of unit 14. Because splined connector 88 is proximate the pivotal axis defined by pins 58R and 58L and is suspended between two universal joints 86 and 90, movement between drawbar 22 and unit 14 on either a horizontal or vertical axis does not interfere with or interrupt power transmission to gear box 92.

The apparatus of the present invention operates as follows: With the apparatus connected to a tractor T as shown in FIG. 1 and with longitudinally extensible member 62 retracted to the position of FIG. 4 the equipment can be moved over an earth surface for treatment thereof. For example, if units 12 and 14 are flails the unit can be moved through an orchard to destroy weeds and the like growing on the surface of the orchard. If the width between adjacent rows of trees in the orchard is wide, the apparatus is positioned as shown in solid lines in FIG. 1 by appropriate manipulation of the valves that feed hydraulic fluid to hydraulic cylinder 68. If, on the other hand, the trees are relatively closely spaced, the apparatus can be moved to the position shown in broken lines in FIG. 1, or to any suitable intermediate position. Moreover, if an obstruction is encountered, the rear unit 14 can be moved inward until the obstruction has been passed and then the rear unit can be returned to its laterally extending position by appropriate actuation of cylinder 28. Because the rear unit is supported on wheels 40L and 40R which are constrained for rotation about a horizontal axis and are spaced apart from one another the rear unit retains the correct orientation in that it trails behind unit 12 in substantial parallelism therewith. In other words, because of the suspension system for supporting unit 14 it is confined to a position transverse to the direction of forward movement of tractor 12.

Figure 6:
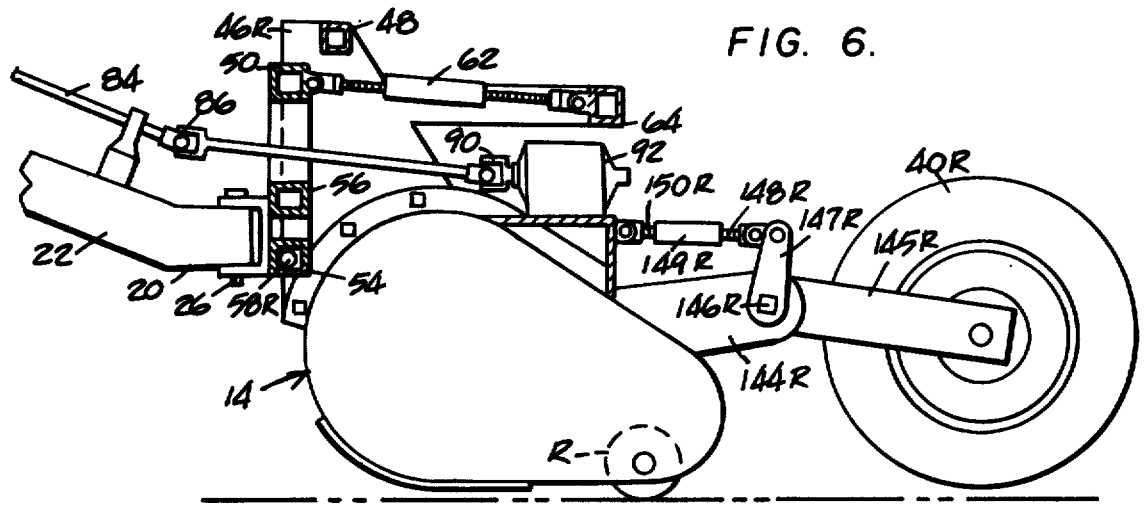
FIG. 6 is a side elevation view of an alternate embodiment of the rear unit of the present invention in a ground treating or lowered position.
Figure 7:
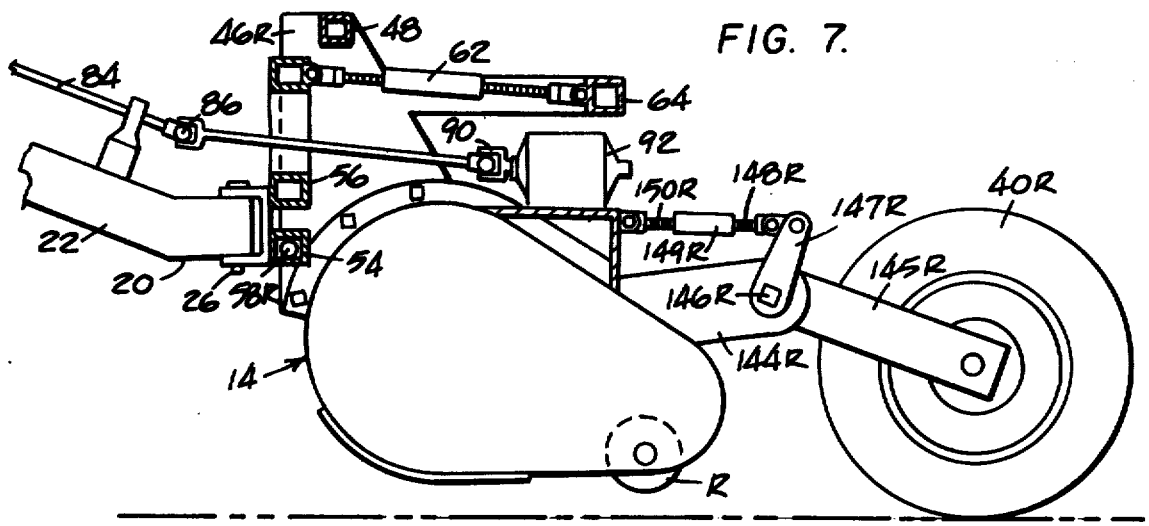
FIG. 7 is a side view of the embodiment of FIG. 6 by showing the rear unit raised for high speed over the road travel.

The embodiment of FIGS. 6 and 7 includes the advantageous features described hereinabove with respect to the embodiment of FIGS. 1 – 5. In addition, the embodiment of FIGS. 6 and 7 has enhanced versatility insofar as the distance and angle of the rear earth treating unit 14 with respect to the ground surface. Only insofar as the structure of FIGS. 6 – 7 is different from that described above will different reference numerals be employed. In the embodiment of FIGS. 6 and 7 there is a pair of rearward extending arms one of which is shown at 144R. Arm 144R is rigid with the rear unit 14 and extends rearward therefrom. At the rear extremity of arm 144R is pivotally secured an arm 145R which at its free end supports an axle 142R of a wheel 140R. Arm 145R is joined to arm 144R by means of a pivot shaft 146R. Secured to shaft 146R is a lever 147R. Lever 147R is rigid with arm 145R. To the free end of lever 147R is one end 148R of a turn buckle structure 149R the opposite end 150R of which is secured rigid with rear unit 14. When turn buckle 149R is rotated to a retracted position (see FIG. 6) arms 144R and 145R approach an aligned position. When turn buckle or hydraulic cylinder 149R is expanded (see FIG. 7) arms 144R and 145R assume an angular position relative to one another. In the position shown in FIGS. 6 and 7, turn buckle 62 has been adjusted so as to maintain unit 14 parallel with the ground surface. By suitable manipulation of turn buckle 62 relative turn buckle 149R virtually any vertical position and/or angle of unit 14 with respect to the ground surface can be achieved. More specifically the position shown in FIG. 6 positions unit 14 for ground surface treatment. The position shown in FIG. 7 readies the rear unit 14 for high speed movement over the road. Obviously positions intermediate those shown in FIGS. 6 and 7 can be established to alter the degree of earth surface treatment effected by unit 14. By the dual angular adjustments of the embodiment of FIGS. 6 and 7 unit 14 can be maintained in parallelism with the ground surface at all times.

If both 62 and 149R are hydraulic cylinders, they can be remotely controllable from the driver's station in the towing vehicle. Thus it will be seen that the present invention provides an earth surface treating mechanism that can treat paths of varying widths in order to enhance the versatility of the apparatus and to make it useful around obstructions such as orchards and the like. Because of the simple system employed total control of the width can be achieved by the tractor operator and without requiring additional personnel. Moreover the apparatus can be quickly transported over the road at high speeds because the rear unit can be quickly and easily raised out of contact with the earth surface.

Although two embodiments have been shown and described, it will be obvious that other adaptations and modifications can be made without departing from the true spirit and scope of the invention.

What is claimed is:

1. Earth surface treating apparatus comprising a first surface treating unit mountable on a vehicle, a second surface treating unit having means for supporting the second unit for movement over the earth surface, a rigid drawbar having a first extremity pivotally secured to said first unit and a second extremity pivotally secured to said second unit so that said second unit trails said first unit, said extremities pivoting on substantially vertical axes, an actuator having first and second ends and means for controllably moving said ends toward and away from one another, said first end being attached to said second unit at a point laterally spaced from the second extremity of said drawbar, said second end of said actuator being attached to said drawbar at a point spaced from said second extremity, and means accessible from the vehicle for remotely controlling said actuator to vary the pivotal position of said drawbar relative said second unit.

2. Apparatus according to claim 1 wherein said supporting means comprises first and second earth contacting wheels, first and second axles journalling respective said wheels for rotation, and means for mounting said axles to said second unit so that said axles are oriented horizontally and in parallelism with said second unit.

3. Apparatus according to claim 2 wherein said axle mounting means includes first and second arms rigid with said second unit, said arms extending rearward of said second unit, said axles being mounted on the distal ends of said arms.

4. Apparatus according to claim 3 in combination with means for elevating said second unit above the earth surface to afford high speed over-the-road travel, said elevating means including means for fixing said second extremity to said second unit for pivotal movement about a horizontal axis and means for pivoting said second unit about said horizontal axis to cause said second unit to rotate upward about said axles.

5. Apparatus according to claim 4 wherein said fixing means includes right and left plates rigid with said unit, said plates being mutually parallel and confronting one another across a space, a generally rectangular frame having a horizontal upper leg, right and left vertical legs depending from respective ends of said horizontal leg, and a lower horizontal leg joined to and extending between the vertical legs at a level below the upper leg, said rectangular frame being sized to fit within said space, and right and left horizontally extending stub shafts pivotally connecting the lower ends of said vertical legs to respective said plates, and wherein said pivoting means includes a longitudinally extensible link extending between said horizontal leg and said second unit.

6. Apparatus according to claim 5 including at least one trunnion plate secured to said rectangular frame and extending forward from said second unit, said trunnion plate having a vertically extending bore therein, said second extremity of said drawbar having a corresponding bore, and a pivot pin disposed in said bores for affording relative pivotal movement about the axis of said pin between said second unit and said drawbar.

7. Apparatus according to claim 4 wherein said arms are each formed of two sections, there being means for joining said sections to one another for relative pivotal movement, and means adjustably establishing the angle between said sections, last said means cooperating with said elevating means to afford adjustment of the angular position of said second unit.

* * * * *